United States Patent [19]
Hansen

[11] Patent Number: 4,502,959
[45] Date of Patent: Mar. 5, 1985

[54] PURIFICATION OF SECONDARY RECOVERY WATERFLOOD LIQUIDS

[75] Inventor: Gerald D. Hansen, Holicong, Pa.

[73] Assignee: Atlantic Richfield Company, Los Angeles, Calif.

[21] Appl. No.: 510,499

[22] Filed: Jul. 5, 1983

[51] Int. Cl.$^3$ ................................................. C02F 1/56
[52] U.S. Cl. .................................... 210/705; 210/728; 210/732; 210/735; 252/8.55 D
[58] Field of Search ............... 210/705, 732, 727, 728, 210/735, 730, 736; 252/8.55 D, 8.55 R

[56] References Cited

U.S. PATENT DOCUMENTS

| | | | |
|---|---|---|---|
| 3,017,028 | 1/1962 | Schoeld | 210/735 |
| 3,285,849 | 11/1966 | Watanabe | 210/735 |
| 3,377,274 | 4/1968 | Burke et al. | 210/736 |
| 3,484,837 | 12/1969 | Odom et al. | 210/738 |
| 3,576,739 | 4/1971 | Ryznar | 210/735 |

*Primary Examiner*—Peter Hruskoci
*Attorney, Agent, or Firm*—C. R. Reap

[57] ABSTRACT

Polysaccharide gums, such as guar gum, are removed from an aqueous liquid by agglomerating the gum with a low molecular weight, water-soluble copolymer of styrene and maleic anhydride and separating the agglomerate from the aqueous liquid.

6 Claims, No Drawings

PURIFICATION OF SECONDARY RECOVERY WATERFLOOD LIQUIDS

BACKGROUND OF THE INVENTION

This invention relates to secondary petroleum recovery processes and more particularly to the prevention of plugging of porous structure formations by foreign substances in the waterflood liquids used in secondary recovery operations.

In secondary oil recovery operations the porosity of subterranean mineral formations is increased by injecting into the formation viscous liquids which fracture the formation. Aqueous liquids which contain swellable or gelable gums are often used as fracturing fluids. Typical of such gums are the polysaccharides such as guar gum, locust bean gum, gum tragacanth, gum agar, the alginates, etc. In practice, viscous gum-containing liquids are pumped into a formation under a sufficient pressure to create the desired extent of fracturing. Following the fracturing step the gum is hydrolyzed by injecting a hydrolyzing agent, such as an enzyme or an acid, into the formation. The formation is then backflushed to remove the hydrolyzed gum. After the fracturing fluid is removed from the formation, a fluid, such as clean water, is injected into the formation to increase the pressure in the formation. The increased pressure caused by this waterflooding facilitates the further removal of oil from the field. U.S. Pat. Nos. 3,058,909 and 3,079,332 describe the use of gums to fracture subterranean formations.

Due to environmental concerns or for economic reasons, it is usually desirable to reuse the water removed from the formation for subsequent formation fracturing or for waterflood operations. However, hydrolyzed gum-containing water cannot be efficiently used because the gum tends to plug up the channels of the formation. It would be desireable to find an economical and efficient method for removing hydrolyzed gums from aqueous fracturing fluids to permit the reuse of the aqueous fluid for subterranean oil recovery operations.

SUMMARY OF THE INVENTION

A method of treating aqueous fracturing fluid so that it can be subsequently used for water flooding operations has now been discovered. Accordingly, it is an object of the invention to present a method of treating water from fractured wells to permit its more efficient use as secondary recovery waterflood fluid. It is another object of the invention to present an efficient method of removing gums from aqueous liquids. It is another object of the invention to present a method of removing hydrolyzed gums from water injection well fracturing fluids. These and other objects of the invention are supported by the following description and examples.

The above objects are accomplished by contacting an aqueous liquid effluent from a fractured subterranean formation containing one or more polysaccharide gums with a low molecular weight water-soluble copolymer of styrene and maleic anhydride to form an agglomerate of the gum and copolymer, and removing the agglomerate from the aqueous liquid by physical separation means.

DETAILED DESCRIPTION OF THE INVENTION

The low molecular weight water-soluble styrene-maleic anhydride copolymers suitable for use in the invention have styrene to maleic anhydride molar ratios in the range of 1:1 to about 10:1 and preferably 1:1 to about 4:1 and molecular weights in the range of about 500 to 5000 and preferably about 1000 to 3000. Styrene-maleic anhydride copolymers which are suitable for use in making the water-soluble copolymers of the invention are sold by ARCO Chemical Company, division of Atlantic Richfield Company under the trademark SMA ®.

To impart water-solubility to the styrene-maleic anhydride copolymer, the copolymer is partially or fully hydrolyzed, preferable by contacting the copolymer with an alkali metal hydroxide or ammonium hydroxide. Suitable alkali metal hydroxide hydrolyzing agents include lithium hydroxide, sodium hydroxide, potassium hydroxide, etc. The preferred hydrolyzing agents are sodium hydroxide and potassium hydroxide. The amount of hydroxide used is a matter of choice. If the equivalent ratio of hydroxide to styrene maleic anhydride is less than about 1:1 the resulting polymer will be partially hydrolyzed. If the equivalent ratio is greater than 1:1 the copolymer will be more highly hydrolyzed. Large excesses of hydroxide will result in copolymers which have more fully hydrolyzed, i.e. maleic acid groups. The water-soluble styrene-maleic anhydride copolymers can be prepared by any of the well known techniques and their preparation forms no part of the invention.

The method of the invention is useful for agglomerating and removing gums from aqeuous liquids. It is particularly useful for agglomerating polysaccharide gums, such as guar gum, locust bean gum, etc. In practicing the invention, the hydrolyzed water-soluble styrene-maleic anhydride copolymer is added to the aqueous liquid containing the polysaccharide to be removed in amounts effective to produce the desired result. The amount of copolymer added to the aqueous liquid will depend upon the particular gums present in the aqueous liquid, the amount of gum present in the aqueous liquid and the degree of purity which it is desired to attain. In some cases it may be desired to remove substantially all of the gum present while in other cases partial gum removal may be sufficient to produce the desired effect. The desired results can usually be accomplished by adding up to about 1000 parts of the hydrolyzed styrene-maleic anhydride copolymer per million parts by weight of aqueous liquid (ppm). In most cases the amount of styrene-maleic anhydride copolymer added to the liquid will be in the range of about 1 to 100 ppm, based on the total weight of the aqueous liquid being treated.

The mixture of aqueous gum-containing liquid and styrene-maleic anhydride copolymer is agitated to promote intimate contact with the gum. The gum and styrene-maleic anhydride copolymer form an agglomerate which can be easily removed from the aqueous liquid. The aqueous liquid is then suitable for use in waterflooding operations in porous formations.

If desired, other flocculants, such as melamine formaldehyde polymers, can be added to the aqueous liquid to facilitate the removal of other foreign agents, such as dispersed oil and finely divided solids.

The agglomerated styrene-maleic anhydride copolymer-gum mixture can be removed from the aqueous liquid by any of the well known methods for liquid-agglomerated solid separation. Typical separation techniques include frothing, filtration, centrifugation and combinations of these procedures. The preferred technique is frothing followed by filtration since the gum-polymer agglomerate lends itself well to this method of separation.

In applying the invention to the separation of hydrolyzed gum from an aqueous well fracturing liquid effluent the effluent is first passed through a free water knockout pot and a deemulsifying unit to separate entrained oil from the water. The effluent from the deemulsifying unit is introduced into a Wemco ® induced air flotation unit. In the Wemco ® unit, air or an inert gas, such as produced gas, is introduced into the water under high shear conditions to effect small bubble formation. The small bubbles entrain the hydrolyzed gum and other hydrophobic materials, forming a froth on the surface of the aqueous liquid. The froth is continuously removed from the surface of the aqueous liquid by decantation over a fixed weir. The Wemco ® unit effluent can be filtered to remove residual fine particulates. The clarified water is then ready for reinjection into the well.

The invention is further illustrated in the following examples. Unless otherwise indicated parts and percentages are on a weight basis. In the following examples the suitability of the treated water for reinjection into a well is determined by two tests. In the first test, referred to as the Beta Test, the aqueous effluent from the Wemco ® unit is continuously passed through a Nuclepore ® 0.2 micron pore size membrane. The average flow rate through the membrane is measured during the first and fifth minutes of filtration through the membrane. The ratio of the average fifth minute flow rate to the average first minute flow rate, referred to as the Beta value, is used as a measure of the clarity of the water. To be acceptable for reinjection into subterranean formation the treated effluent should have a Beta value of at least 0.7. The second test, known as the Water Quality Test, measures the amount in ppm and particle size in microns of the solids in water. A Water Quality value of less than 10 is generally required as an acceptable maximum for injection of aqueous liquids in secondary recovery waterflood operations.

EXAMPLE I

Deemulsified water from a San Joaquin Valley fractured diatomite well field which contained hydrolyzed guar gum was fed into a Wemco ® unit at a flow rate of 5000 barrels a day. Petroleum gas produced from the diatomite field was fed into the Wemco ® unit at a flow rate sufficient to produce a froth. To facilitate solids removal 200 ppm of melamine formaldehyde polymer, sold by ChemLink, Inc. under the trademark ARCO 6110, was continuously introduced into the feed stream to the Wemco ® unit. The effluent from the Wemco ® unit was passed through a diatomaceous earth filter. Beta and Water Quality Tests were periodically conducted on the effluent from the diatomaceous earth filter. These data are reported in the TABLE as runs 1 to 7.

EXAMPLE II

The procedure of Example I was repeated except that 25 ppm of 20% aqueous solution of styrene-maleic anhydride copolymer which was hydrolyzed with potassium hydroxide to greater than 95% hydrolysis was continuously injected into the feed stream to the Wemco ® unit. Beta and Water Quality tests were periodically conducted on the diatromaceous earth filter effluent. The results of these test are reported in the TABLE as Runs 8 to 24.

TABLE

| Run | Treatment | Beta | Water Quality |
|---|---|---|---|
| 1 | a[1] | .76 | 16 |
| 2 | a | .73 | 30 |
| 3 | a | .76 | 14 |
| 4 | a | .79 | — |
| 5 | a | .41 | — |
| 6 | a | .77 | — |
| 7 | a | .71 | 10.4 |
| 8 | b[2] | .76 | 3 |
| 9 | b | .75 | — |
| 10 | b | .77 | 6 |
| 11 | b | .78 | 5.9 |
| 12 | b | .68 | — |
| 13 | b | .79 | 3.6 |
| 14 | b | .9 | 7.9 |
| 15 | b | .94 | 5.7 |
| 16 | b | .87 | — |
| 17 | b | .73 | — |
| 18 | b | .82 | 7.9 |
| 19 | b | .906 | 5.5 |
| 20 | b | .92 | 6.8 |
| 21 | b | .87 | 4.7 |
| 22 | b | .9 | 6.0 |
| 23 | b | .94 | 4 |
| 24 | b | .83 | 8.3 |

[1]Treatment a is melamine formaldehyde polymer.
[2]Treatment b is melamine formaldehyde polymer and water-soluble styrene-maleic anhydride copolymer.

A comparison of the results obtained from Examples I and II show the benefits of the method of the invention. The average Beta values obtained in Run 8 to 24 is 0.83 whereas the average Beta value obtained in Runs 1 to 7 is 0.70. Furthermore, the Water Quality value obtained in Runs 8 to 24 is consistantly significantly lower than that obtained in Runs 1 to 7.

Although the invention has been described with particular reference to a specific example, the invention includes variations. For example, the invention can be practiced on other gum-containing aqueous liquids and other water-soluble styrene-maleic anhydride copolymers can be used in the method of the invention. The scope of the invention is limited only by the breadth of the appended claims.

What is claimed is:

1. A method of removing a polysaccharide gum from an aqueous waterflood liquid used in secondary recovery operations comprising contacting the gum-containing aqueous liquid with a water-soluble copolymer of styrene and maleic anhydride having a molecular weight in the range of about 500 to 5000 and a styrene to maleic anhydride molar ratio in the range of 1:1 to about 10:1 in an amount sufficient to form an agglomerate of said polysaccharide gum and said copolymer and removing the agglomerate from the aqueous liquid.

2. The method of claim 1 wherein the water-soluble styrene-maleic anhydride copolymer has a styrene to maleic anhydride molar ratio of about 1:1 to about 4:1.

3. The method of claim 2 wherein the polysaccharide gum is guar gum.

4. The method of claim 1 wherein the water-soluble styrene-maleic anhydride copolymer has a molecular weight in the range of about 1000 to 3000 and a styrene to maleic anhydride molar ratio of about 1:1 and about 4:1.

5. The method of claim 4 wherein the gum-containing aqueous liquid is additionally contacted with melamine-formaldehyde polymer.

6. The method of claim 4 wherein said agglomerate is removed by frothing.

* * * * *